United States Patent
Hayakawa et al.

(10) Patent No.: US 8,659,303 B2
(45) Date of Patent: Feb. 25, 2014

(54) OCCUPANT DETECTION SENSOR TESTING APPARATUS AND METHOD

(75) Inventors: Hideyuki Hayakawa, Nishio (JP); Takashi Inoue, Kariya (JP)

(73) Assignee: Denso Corporation, Kariya (JP)

( * ) Notice: Subject to any disclaimer, the term of this patent is extended or adjusted under 35 U.S.C. 154(b) by 304 days.

(21) Appl. No.: 13/279,624

(22) Filed: Oct. 24, 2011

(65) Prior Publication Data

US 2012/0098548 A1    Apr. 26, 2012

(30) Foreign Application Priority Data

Oct. 26, 2010    (JP) .................. 2010-239934

(51) Int. Cl.
*G01R 35/00*    (2006.01)
*G01R 27/26*    (2006.01)

(52) U.S. Cl.
USPC ........... 324/601; 324/658; 324/661; 324/663; 324/684; 324/686; 340/562

(58) Field of Classification Search
USPC .......... 324/555, 658–690, 601; 340/667, 552, 340/562
See application file for complete search history.

(56) References Cited

U.S. PATENT DOCUMENTS 6,546,817 B1    4/2003    Aoki

FOREIGN PATENT DOCUMENTS

JP    2000-298057    10/2000
JP    2005-145362    6/2005

*Primary Examiner* — Patrick Assouad
*Assistant Examiner* — Alexander J Nemtzow
(74) *Attorney, Agent, or Firm* — Harness, Dickey & Pierce, PLC

(57) ABSTRACT

A testing apparatus for testing whether an occupant detection sensor normally operates is disclosed. The testing apparatus includes: a ground that is an electrically-conductive structural member of the seat; an electrode plate that is electrically-conductive and is on the seat at a time of testing; multiple capacitors that are electrically connected between the electrode plate and the ground and are different in electrostatic capacity from each other; a switch mechanism that selects and switches one capacitor of the multiple capacitors; and a determination result check portion that determines, while switching the one capacitor by the switch mechanism, whether a signal outputted from the occupant detection sensor is a determination result corresponding to the switched one capacitor.

20 Claims, 13 Drawing Sheets

OCCUPANT DETECTION SENSOR TESTING APPARATUS AND METHOD

CROSS REFERENCE TO RELATED APPLICATION

The present application is based on and claims priority to Japanese Patent Application No. 2010-239934 filed on Oct. 26, 2010, disclosure of which is incorporated herein by reference.

TECHNICAL FIELD

The present invention relates to a testing apparatus and method for testing whether an occupant detection sensor, which determines an occupant based on an electrostatic capacity change, operates normally.

BACKGROUND

A technique disclosed in Patent Document 1 relates to an occupant detection sensor that outputs a weight-dependent value to detect an occupant seated on a vehicle seat. Application of the technique of Patent Document 1 may make it possible to test whether the occupant detection sensor normally operates based on whether the output value corresponds to the weight.
Patent Document 1: JP-2005-145362A There are a weight-type sensor and a capacitive sensor as types of occupant detection sensor. The weight-type sensor determines an occupant based on a weight as is the case of the technique of Patent Document 1. The capacitive sensor determines an occupant based on an electrostatic capacity change. As for this capacitive sensor, the electrostatic capacity of an occupant cannot be simulated by the weight alone. Therefore, application of the technique of Patent Document 1 cannot make it possible to test whether the capacitive sensor normally operates.

When a person (human body) is directly seated on the seat, the deployment of the air bag is required. By contrast, when an infant is seated on a child restraint system (e.g., child seat) attached to the seat, the deployment of the air bag is not required. The person and the infant on the child restraint system (e.g., one years of age) have different electrostatic capacities. From this point, a conceivable testing method involves a person who is actually seated and a child restraint system that is actually mounted. In these cases, however, the testing becomes complicated. Therefore, a testing apparatus or method capable of testing a capacitive occupant detection sensor in a simple way is desired.

SUMMARY

In view of the foregoing, it is an objective of the present disclosure to provide a testing apparatus or a testing method that can test a capacitive occupant detection sensor in a simple way to determine whether the capacitive occupant detection sensor normally operates.

According to a first example of the present disclosure, a testing apparatus for testing whether an occupant detection sensor normally operates is provided, wherein the occupant detection sensor determines an occupant based on magnitude of electrostatic capacity of the occupant on a seat. The testing apparatus comprises: a ground that is an electrically-conductive structural member of the seat; an electrode plate that is electrically-conductive and is on the seat at a time of testing; a plurality of capacitors that is electrically connected between the electrode plate and the ground, and that is different in electrostatic capacity from each other; a switch mechanism that selects and switches one capacitor of the plurality of capacitors; and a determination result check portion that determines, while switching the one capacitor by the switch mechanism, whether a signal outputted from the occupant detection sensor is a determination result corresponding to the switched one capacitor.

According to a second example of the present disclosure, a testing method for testing whether an occupant detection sensor, which determines an occupant based on magnitude of electrostatic capacity of the occupant on a seat, normally operates is provided. The testing method comprises: preparing a testing apparatus that includes a ground that is an electrically-conductive structural member of the seat, an electrode plate that is electrically-conductive and is on the seat at a time of testing and, and a plurality of capacitors that is electrically connected between the electrode plate and the ground; selecting and switching one capacitor of the plurality of capacitors; and determining, while switching the one capacitor, whether a signal outputted from the occupant detection sensor is a determination result corresponding to the switched one capacitor.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
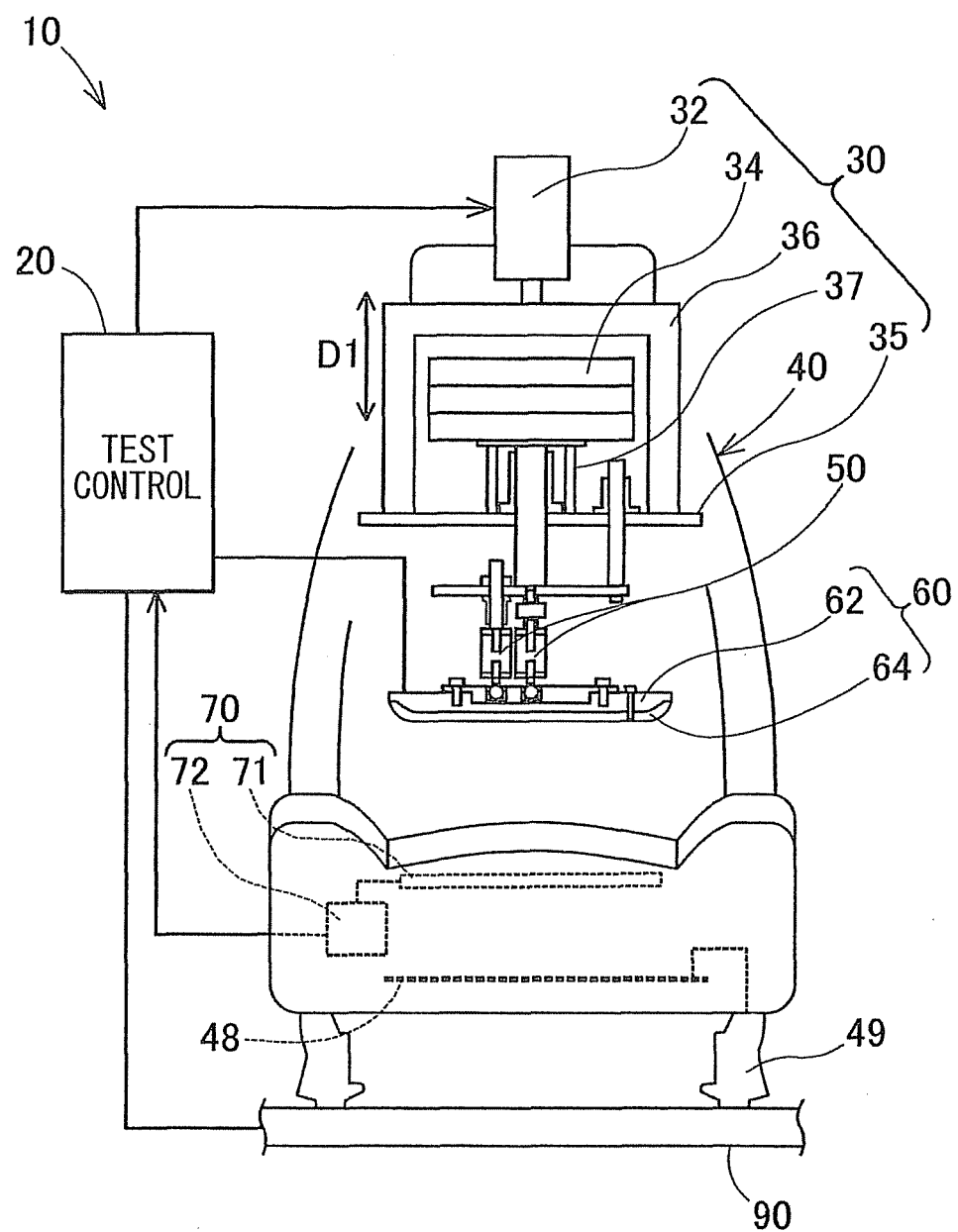
FIG. 1 is a front view illustrating a testing apparatus for an occupant detection sensor.

Embodiments will be described based on the accompanying drawings. In the following, a term "connect" is used to refer to also "electrically connect". As for capacitors in the drawings, the same reference is used to refer to a capacitor and its capacity. For example, "Cx" representing a capacitor is also used to refer to its capacity. Directions such as upper, lower, left, right directions are defined based on the drawings.

First Embodiment

Figure 2A:
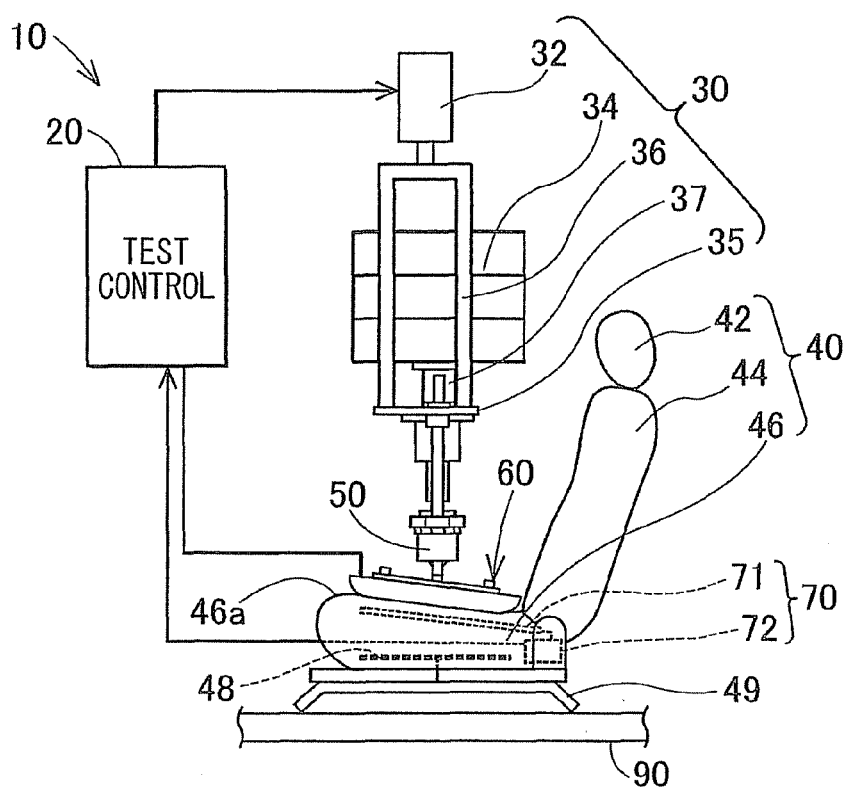
FIG. 2A is a side view illustrating the testing apparatus for the occupant detection sensor when a load is applied.
Figure 2B:
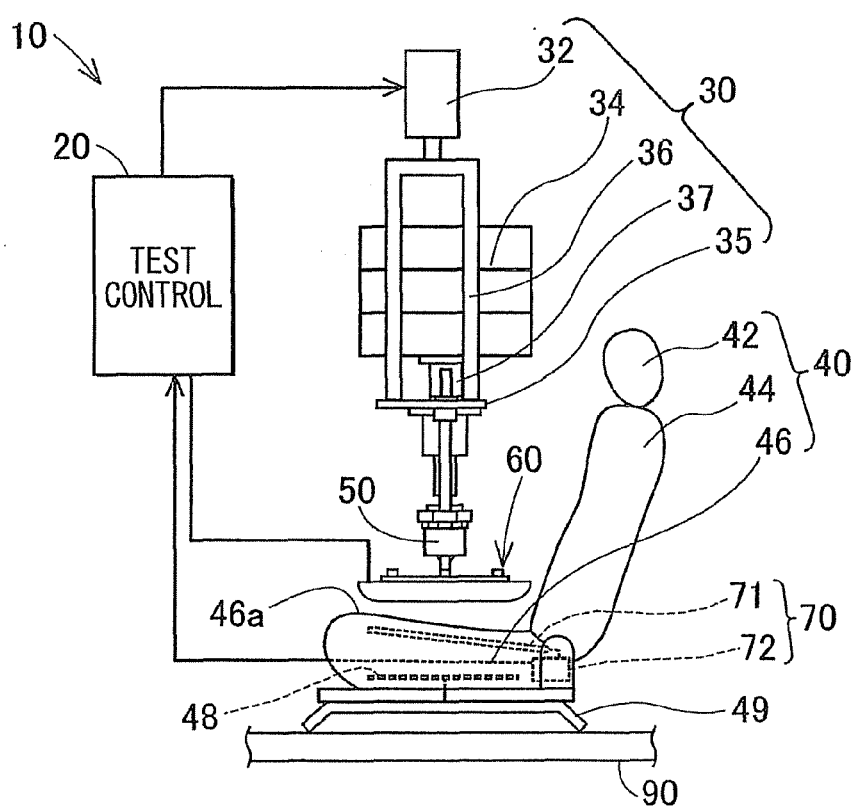
FIG. 2B is a side view illustrating the testing apparatus for the occupant detection sensor when the load is not applied.
Figure 3A:
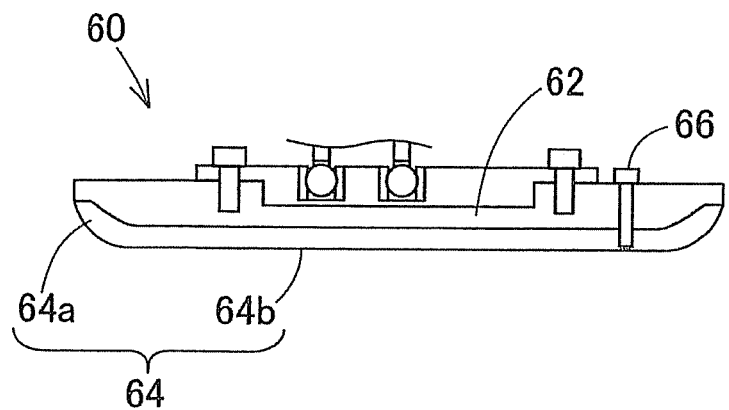
FIG. 3A is a side view illustrating a first configuration of an occupant simulator.
Figure 3B:
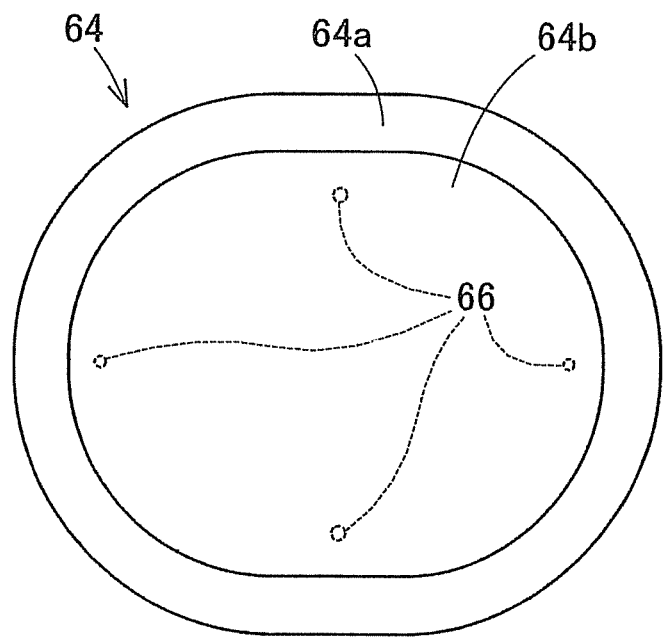
FIG. 3B is a bottom view illustrating the first configuration of the occupant simulator.
Figure 4:
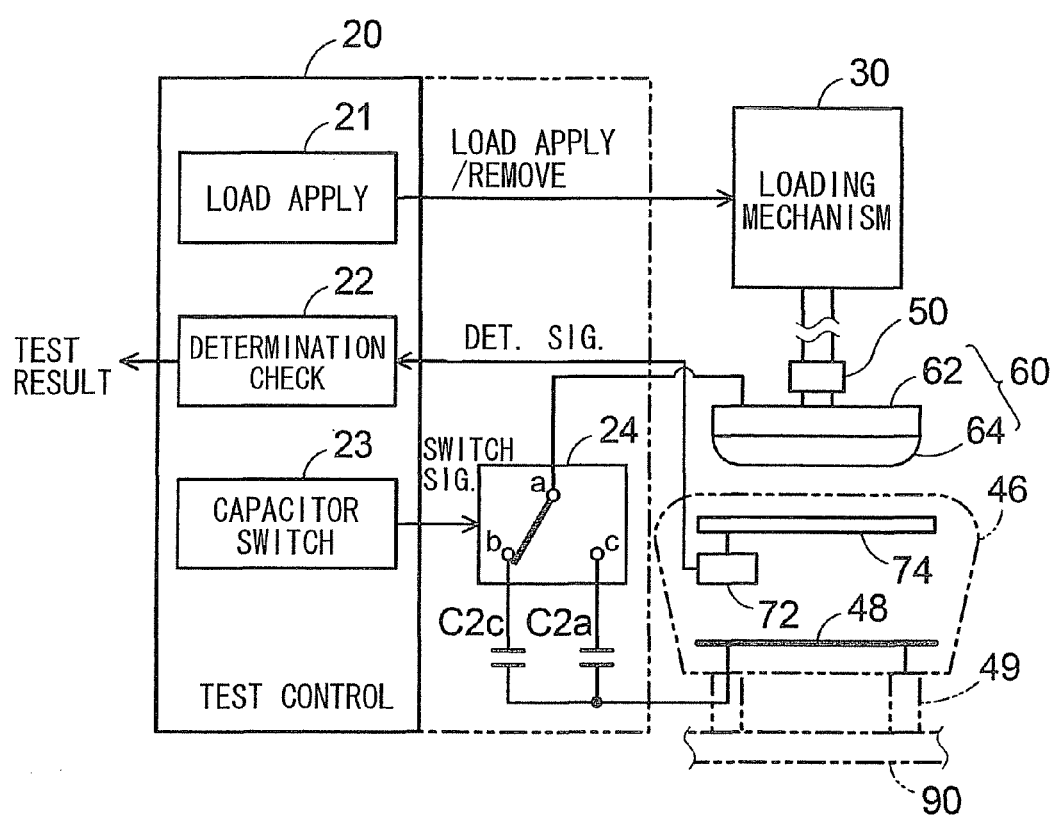
FIG. 4 is a diagram illustrating a first configuration of a test controller.
Figure 5:
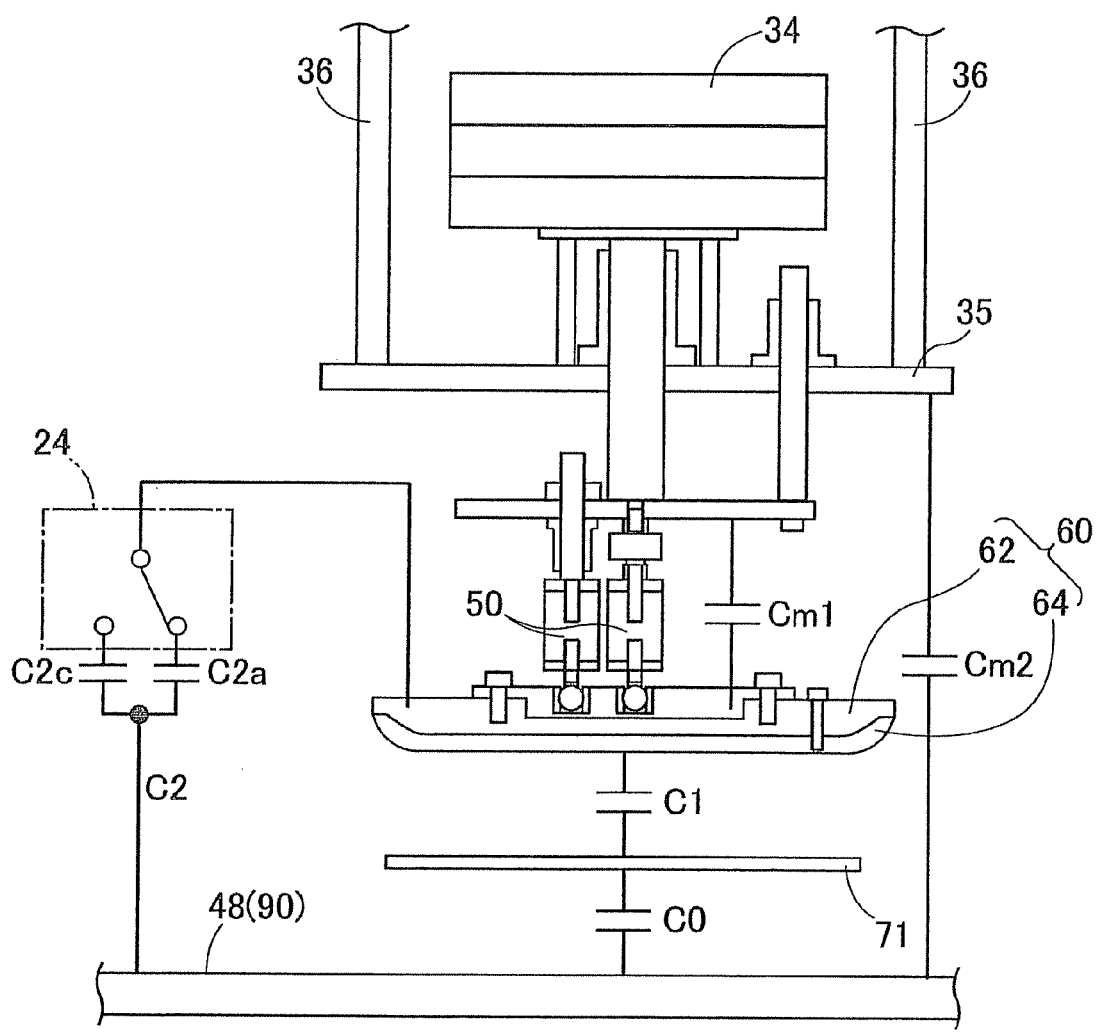
FIG. 5 is a diagram illustrating an electrostatic capacity generated at each part.
Figure 6:
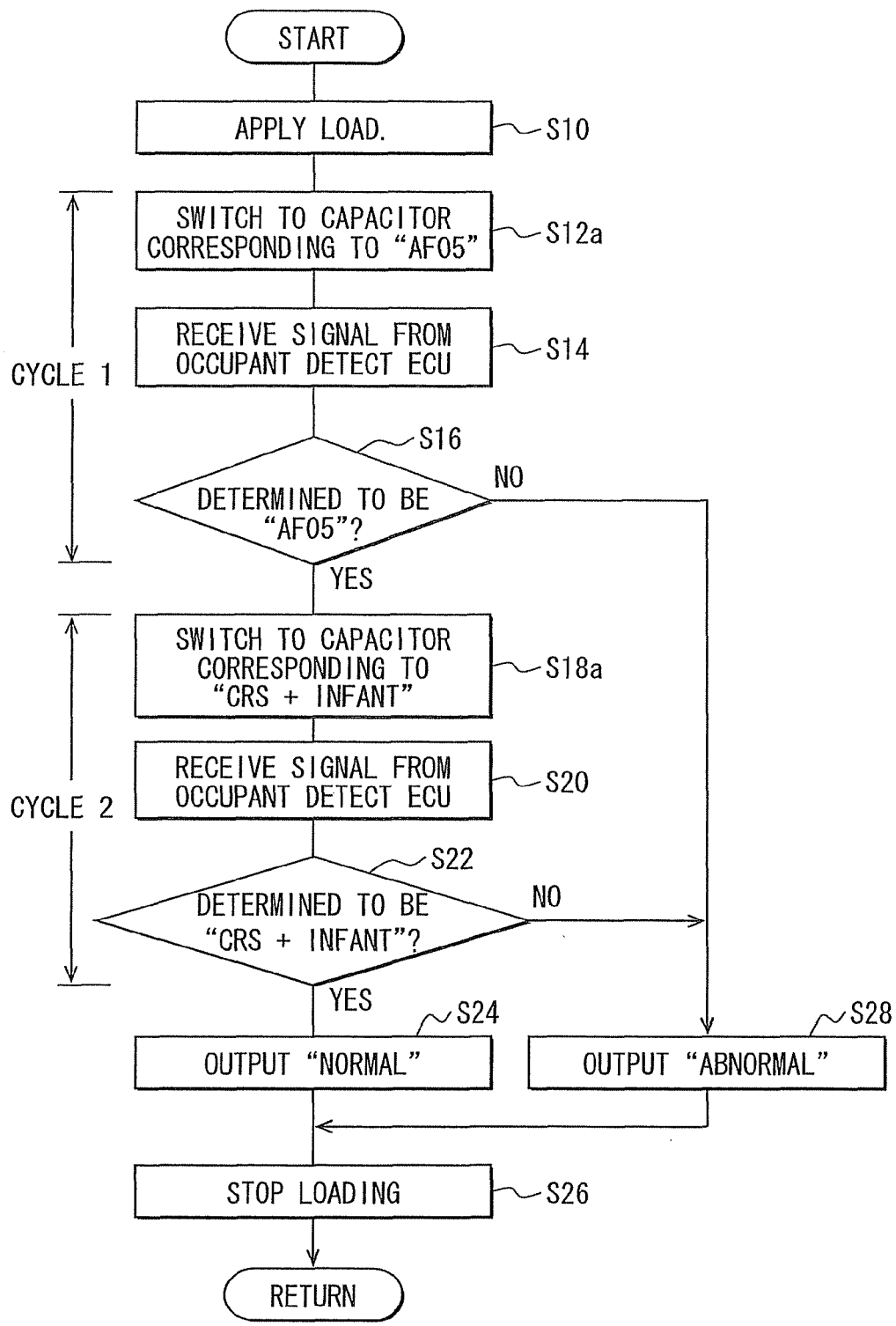
FIG. 6 is a flowchart illustrating a first procedure of a sensor testing process.

In the first embodiment, a testing apparatus for an occupant detection sensor (also simply referred to as "sensor testing apparatus") will be described with reference to FIGS. 1 to 6. The sensor testing apparatus of the present embodiment tests an occupant detention sensor mounted to a seat in a vehicle. FIGS. 1, 2A and 2B schematically illustrate a configuration of a sensor testing apparatus. FIG. 1 illustrates a front view of the sensor testing apparatus. FIG. 2A illustrates a side view of the sensor testing apparatus in a loaded state. FIG. 2B illustrates a side view of the sensor testing apparatus in an unloaded state (also called "a load removal sate"). FIGS. 3A and 3B illustrate a first configuration of an occupant simulator. Specifically, FIG. 3A illustrates a side view and FIG. 3B illustrates a bottom view. FIG. 4 schematically illustrates a first configuration of a test controller. FIG. 5 schematically illustrates capacities generated in various parts. FIG. 6 illustrates a flowchart of an example procedure of a sensor testing process.

The sensor testing apparatus 10 in FIG. 1 tests an occupant detection sensor 70 (see FIGS. 2A and 2B) equipped in a seat 40. The seat 40 is a typical seat in a vehicle (i.e., a seat for use in a vehicle). The seat 40 includes a headrest 42, a back face portion 43, a seating face portion 46, a GND 48, a seat frame 49, and the like. The seat 40 further includes a cushion pad, an outer skin (seat cover) for covering the cushion pad, and the like. The seating face portion 46 has an upper surface as a seating surface 46a. An occupant detection sensor 70 is arranged inside the seating face portion 46. The GND 48 is also referred to as "ground". The GND 48 is an electrically-conductive structural member arranged in the seat. For example, the GND 48 includes a seat frame, a spring, a net, a wiring or the like. When being grounded, the GND 48 has zero V. The seat frame 49 corresponds to a chair leg, and is electrically connected to the GND 48. At least during the test, the seat frame 49 is fixed to a test base 90 by a fixing member such as a bolt, a screw and the like. A material of the test base 90 may not matter as long as the test base 90 is insulated from a floor surface etc. For example, it may not matter whether the test base 90 is made of an electrically-conductive material or an insulating material.

The occupant detection sensor 70 includes an occupant detection sensor mat 71, an occupant detection electronic control unit (ECU) 72, and the like. The occupant detection sensor mat 71 is a mat-shaped capacitive electrode plate. The occupant detection ECU 72 uses the occupant detection sensor mat 71 to determine an occupant (i.e., perform an occupant determination operation) and output a determination signal. For example, the occupant detection ECU 72 determines whether the occupant is an adult or an infant, and determines whether the occupant is present or absent.

The sensor testing apparatus 10 includes a test controller 20, a load mechanism 30, an insulator 50, an occupant simulator 60, and the like. A configuration of the test controller 20 will be described later with reference to FIG. 4. The load mechanism 30 can correspond to "test apparatus body (abbreviated as apparatus body)", and has a function to apply a load to the seating surface 46a (see FIG. 2) and remove the load from the seating surface 46a. The load mechanism 30 includes an actuator 32, a weight portion 34, a frame 36 and the like. The actuator 32 may include a motor, a cylinder or the like. The actuator 32 displaces the frame 36 in a predetermined direction (see a direction of the arrow D1 illustrated in FIG. 1).

The frame 36 includes a crossarm 35, a base 37 and the like. The insulator 50 and the occupant simulator 60 are hung from the crossarm 35. A weight portion 34 having a predetermined weight, e.g., 30 kg, is mounted on an upper surface of the base 37. The weight portion 34 and the insulator 50 are mechanically connected with each other via a connection member such as a rod, a wire or the like. As shown in FIGS. 1 and 3, the insulator 50 and the occupant simulator 60 (in particular, an upper surface of the electrode plate 62) are mechanically connected with each other by a boll joint, and thus, the occupant simulator 60 is tiltably (but un-rotatably) movable with respect to the insulator 50. The load mechanism 30 is insulated from the GND 48 (see FIG. 4).

In the above-described load mechanism 30, when the actuator 32 displaces the frame 36 downward, the occupant simulator 60 (in particular, a lower surface of an insulation plate 64) eventually contacts the seat 40 (i.e., the seating surface 46a). In contacting the seat 40, the occupant simulator 60 moves in accordance with an inclination of the seating surface 46a. Since the occupant simulator 60 is hung from the crossarm 35, own weight of the occupant simulator 60 is applied to the seat 40, and then, the weight of the weight portion 34 is applied to the occupant simulator 60 via a connection portion. In this way, the weight of the weight portion 34 is applied to the seat 40, and the weight of the weight portion 34 is uniformly applied at a contact surface with the seating surface 46a.

The actuator 32 is configured to operate based on a signal transmitted from the test controller 20. For example, when the signal for load application is transmitted, the occupant simulator 60 presses the seating surface 46a, as shown in FIG. 2A. This state is called herein "loaded state". When the signal for load removal is transmitted in the loaded state, the occupant simulator 60 moves apart from the seating surface 46a, as shown in FIG. 2B. This state is called herein "unloaded state".

The insulator 50 insulates the test apparatus body (load mechanism 30 etc.) and the occupant simulator 60 from each other. In order to suppress a dielectric constant change caused by water absorption of the material, it may be preferable that the insulator 50 be made of a low water absorptivity material, e.g., polyetheretherketone (PEEK). This insulator 50 can be omitted when, for example, the test apparatus and the GND 48 can be insulated from each other. When the insulator 50 is interposed, the test apparatus body and the GND 48 may be electrically connected (connected) with each other.

The occupant simulator 60 simulates a state where the occupant is seated on the seat 40. As shown in FIGS. 3A and 3B, the occupant simulator 60 includes an electrode plate 62, an insulation plate 64 and the like. The electrode plate 62 is formed from an electrically-conductive member, a material of which may not matter. Together with the insulation plate 64, the electrode plate 62 is movable by the actuator 32.

The insulation plate 64 has a predetermined thickness (e.g., 10 mm), and is arranged so as to cover a seating-surface-side surface (i.e., a lower surface) of the electrode plate 62. The seating surface side surface is a surface facing the seating surface 46a. The insulation plate 64 has an insulating function as similar as the insulator 50 has. The insulating plate 64 has a peripheral edge portion 64a and a flat plate portion 64b. The peripheral edge portion 64a is rounded to have a predetermined curvature (e.g., R50). The insulation plate 64 is detachably mounted to the electrode plate 62 via the fixing member 66 (e.g., a bolt, a screw, or the like).

Next, the test controller 20 will be explained with reference to FIG. 4. The test controller 20 includes a load application portion 21, a determination result check portion 22, and a capacitor switching portion 23. The load application portion 21 can correspond to a load application means. The determination result check portion 22 can correspond to a determination result check means. The capacitor switching portion 23 can correspond to a capacitor switching means. In the present embodiment, the test controller 20 may not include a switch 24 (switch means) and multiple capacitors C2c, C2a. Alternatively, the test controller 20 may be configured to include the switch 24 and the multiple capacitors C2c, C2a, as shown by the two-dotted chain line in FIG. 4. The test controller 20 may be achieved as a single processing device. Alternatively, at least some of or all of the above-described portions (means) may be achieved by a processing device such an ECU (electronic control unit). In any case, the present embodiment may be provided with the below-described functions.

The load application portion 21 outputs a signal, which corresponds to loading or unloading, to the load mechanism 30 (specifically, the actuator 32). At a time of testing, the load application portion 21 outputs a loading signal indicating that the load is applied to the seat 40 (in particular, the seating face portion 46), so that the loaded state illustrated in FIG. 2A is realized. At a time of non-testing, the load application portion 21 outputs an unloading signal indicating that the load is not applied to the seat 40 (in particular, the seating face portion 46), so that the unloaded state illustrated in FIG. 2B is realized.

The multiple capacitors C2c, C2a are different from each other in electrostatic capacity. Each of the multiple capacitors C2c, C2a is arranged to be connectable between the electrode plate 62 and the GND48. The capacitor C2c has an electrostatic capacity corresponding to a body type model "a child restrain system (CRS)+a one-years-old (1YO) infant". The capacitor C2a has an electrostatic capacity corresponding to another body type model "AF05" representing a US adult female. For test accuracy improvement, it may be preferable to shorten a wiring connecting between the electrode plate 62 and the capacitors C2c, C2a as short as possible. From this viewpoint, in the present embodiment, the capacitors C2c, C2a are provided separated from the test controller 20 and arranged in the vicinity of the seat 40.

The capacitor switching portion 23 and the switch 24 can correspond to a switch mechanism. The capacitor switching portion 23 outputs (transmits) a switch signal to the switch 24 to select one capacitor from the multiple capacitors C2c, C2a and connect the one capacitor. Specifically, in response to receiving the switch signal, the switch 24 selectively switches the one capacitor, so that the switch 24 establishes a connection between the electrode plate 62 and the GND48 via the selected one capacitor. Any circuit element capable of switching the capacitor connection can be included in the switch 24. For example, the circuit element may be a contact switch, a relay (e.g., an electromagnetic relay, a semiconductor relay etc.), a transistor (e.g., a bipolar transistor, a field-effect transistor etc.), a photocoupler, or the like. In the drawings, for simple illustration of switching states, a contact switch graphic symbol is used to refer to the switch 24.

In an example show in FIG. 4, a terminal "a" is connected with the electrode plate 62, and a terminal "b" is connected with one end of the capacitor C2c, and a terminal "c" is connected with one end of the capacitor C2a. The other end of each of the capacitors C2c and C2a are connected with the GND 48. When a switching element connects the terminal "a" and the terminal "b", the capacitor C2c is selected and connected. When the switching element connects the terminal "a" and the terminal "c", the capacitor C2a is selected and connected. In the followings, a symbol "C2" denotes the electrostatic capacity of the capacitor selected and connected by the switch mechanism (the capacitor switching portion 23 and the switch 24). That is, depending on the selection (switching), the electrostatic capacity of the selected capacitor becomes C2=C2c or C2=C2a. In accordance with the above-described arrangement of the multiple capacitors C2c, C2a in the vicinity of the seat 40, the switch 24 is also arranged in the vicinity of the seat 40.

The occupant detection ECU 72 applies an alternating voltage to the occupant detection sensor mat 71 in a state where one capacitor is selected from the multiple capacitors C2c, C2a and connected between the electrode plate 62 and the GND 48. In response to the application of the voltage, a current flows in the occupant detection sensor mat 71. The occupant detection ECU 72 detects a current value of this current, and measures a test electrostatic capacity Ct based on the detected current value. Then, based on whether the measured test electrostatic capacity Ct exceeds a threshold, the occupant detection ECU 72 determines an occupant (occupant determination operation) and outputs a determination signal. For example, the occupant detection ECU 72 determines whether the occupant is "AF05" or "CRS+1YO infant", or determines whether the occupant is absent or present.

The determination result check portion 22 can correspond to test determination means or portion. The determination result check portion 22 makes a determination as to whether a signal outputted from the occupant detection ECU is a determination result corresponding to the capacitor selected and switched (connected) by the capacitor switching portion 23. It may be preferable that, for all of the multiple capacitors C2c and C2a, the determination result check portion 22 make the above determination. Alternatively, for some of the capacitors C2c, C2a (e.g., only the capacitor C2a), the determination result check portion 22 may make the above determination. To a display device or the like, the determination result check portion 22 outputs a result signal indicating a result of testing whether the occupant detection sensor 70 normally operates.

An electrostatic capacity generated between elements due to the above-described configuration will be explained with reference to FIG. 5. As described above, the capacitor C2c, C2a is selectively connected between the electrode plate 62 and the GND48 (see FIG. 4). Although the insulation plate 64 is interposed between the electrode plate 62 and the occupant detection sensor mat 71, an electrostatic capacity C1 is generated equivalently. The occupant detection sensor mat 71 detects the electrostatic capacity C1 and outputs the detected electrostatic capacity C1 in the form of voltage or current. An electrostatic capacity C0 is equivalently generated between occupant detection sensor mat 71 and the GND48. The test electrostatic capacity Ct, which is generated in the seat 40 as a whole, can be expressed as the below-described equation (1):

$$Ct = \frac{1}{C1} + \frac{1}{C2} + C0 \qquad \text{equation (1)}$$

A capacitive coupling Cm is generated in parallel with the multiple capacitors C2c, C2a. In detail, the capacitive coupling Cm includes an electrostatic capacity Cm1 generated between the electrode plate 62 and the test apparatus body (e.g., the load mechanism 30 etc.), and an electrostatic capacity Cm2 generated between the test apparatus body and the GND 48. The capacities Cm1 and Cm2 have a relation "Cm=Cm1+Cm2". Because the capacitor selected and switched by the switch 24 is connected in parallel with the capacitive coupling Cm in an equivalent circuit, a smaller capacitive coupling Cm suppresses an influence on a test result. Because of this, a configuration of the insulator 50 is adjusted, so that the capacitive coupling Cm is smaller than one of the multiple capacitors C2c, C2a that has the smallest capacity. The adjustable configuration of the insulator 50 includes, for example, shape, material or the like. Thickness may be adjusted if the insulator 50 is in the form of plate. When the capacitive coupling Cm is generated, the electrostatic capacity C2 of the capacitor C2c, C2a needs to be corrected with the electrostatic capacity Cm. The electrostatic capacity having been corrected is called a "corrected electrostatic capacity", and can be obtained from the following equation (2). To obtain the corrected electrostatic capacity of the capacitor C2c, "C2c" is substituted into "C2". To obtain the corrected electrostatic capacity of the capacitor C2a, "C2a" is substituted into "C2". The electrostatic capacity Ct in this case can be obtained from the below-described equation (3) because the electrostatic capacity C2 in the equation (1) needs to be replaced with the corrected electrostatic capacity Cr.

$$Cr = \frac{C2}{1 - Cm \cdot C2} \text{ where } Cm = Cm1 + Cm2 \qquad \text{equation (2)}$$

$$Ct = \frac{1}{C1} + \frac{1}{Cr} + C0 \qquad \text{equation (3)}$$

An example procedure of a sensor testing process performed by the sensor testing apparatus 10 (in particular, the test controller 20) will be described with reference to FIG. 6. After the occupant detection sensor 70 is put in a testable stage, the sensor testing process is performed. In FIG. 6, steps S10 and S26 can correspond to a load application step, which is performed by the load application portion 21 (or load application means). Steps S12a, S18a can correspond to a switch step, which is performed by the capacitor switching portion 23 (or the capacitor switching means). Steps S16, S22, S24, S28 can correspond to a determination result check step, which is conducted by the determination result check portion 22 (or the determination result check means). In connection with the body type model, it is assumed that the "AF05" model is used for a model of non-infant (adult), and the "one years old infant (1YO)+a child restraint system (CRS)" model is used for a model of infant. The "AF05" model corresponds to a lighter weight female at 5% in a normal distribution of US adult female weight. The "1YO+CRS" model corresponds to a one years old infant being seated on the CRS.

The sensor testing process illustrated in FIG. 6 is as follows. At S10, the load application portion 21 transmits the signal to the actuator 32, so that the load is applied to the seat 40 (in particular, the seating face portion 46). At S12a, the capacitor switching portion 23 transmits the switch signal to the switch 24, so that the switch 24 switches to the capacitor C2a corresponding to the adult. When the load is applied, the occupant simulator 60 is put on the seating surface 46a of the seat 40 (see FIG. 2A). In this state, at S14, the determination result check portion 22 receives the signal transmitted from the occupant detection ECU 72.

Content of the signal received at S14 is called herein first reception content of the signal. At S16, the determination result check portion 22 determines whether the first reception content is a determination result corresponding to the electrostatic capacity of the capacitor C2a. When the first reception content does not correspond to "AF05" and does not indicate the adult, the determination "NO" is made at S16, and the process proceeds to S28. At S28, the determination result check portion 22 outputs a result signal indicating that a test result is "abnormal", to an ECU, a display device or the like. Then, at S26, the load application portion 21 transmits the signal to the actuator 32 to release the application of the load, and the process returns. When the applied load is released, the occupant simulator 60 is spaced apart from the seating surface 46a (see FIG. 2B).

When the first reception content corresponds to "AF05", the determination "YES" is made at S16, and the process proceeds to steps 18a to S22 to determine an infant. At S18a, the capacitor switching portion 23 outputs the switch signal to the switch 24, so that the switch 24 switches to the capacitor C2c corresponding to "CRS+1YO infant". Then, at S20, the determination result check portion 22 receives the signal transmitted from the occupant detection ECU 72.

Content signal received at S20 is called herein second reception content of the signal. At S22, the determination result check portion 22 determines whether the second reception content is a determination result corresponding to the electrostatic capacity of the capacitor C2c. When the second reception content does not correspond to "CRS" and does not indicate the infant, the determination "NO" is made at S22, and the process proceeds to S28. At S28, a result signal indicating that a test result is "abnormal" is outputted to an ECU, a display device or the like. Then, at S26, the load application portion 21 transmits the signal to the actuator 32 to release the application of the load, and the process returns.

When the second reception content indicates "CRS", the determination "YES" is made at S22. In this case, the occupant detection ECU 72 has outputted a proper determination signal in both cases of the adult (AF05) and the infant (1YO infant+CRS). Thus, at S24, a result signal indicating that the test result is "normal" is outputted from the determination result check portion 22 to the ECU, the display device or the like. At S26, the load application portion 21 transmits the signal to the actuator 32 to release the application of the load, and the process returns.

The first embodiment can have the following configurations and advantages.

For example, a testing apparatus for testing whether an occupant detection sensor 70, which determines an occupant based on magnitude of electrostatic capacity of the occupant on a seat, normally operates. The testing apparatus includes: a GND 48, an electrode plate 62, multiple capacitors C2c, C2a, a switch mechanism (capacitor switching portion 23 and switch 24), and a determination result check portion 22. The GND 48 is an electrically-conductive structural member of the seat 40. The electrode plate 62 is on the seat at least at a time of testing. The multiple capacitors C2c, C2a are electrically connected between the electrode plate 62 and the GND 48, and are different in electrostatic capacity from each other. The switch mechanism (capacitor switching portion 23 and switch 24) selects and switches one capacitor of the multiple capacitors C2c, C2a. The determination result check portion 22 determines, while switching the one capacitor by the switch mechanism, whether a signal outputted from the occupant detection sensor 70 (occupant detection ECU 72) is a determination result corresponding to the switched one capacitor.

Furthermore, a testing method for testing whether an occupant detection sensor normally operates can be configured as follows. The testing method includes preparing a testing apparatus, which includes a GND 48, an electrode plate 62, and multiple capacitors C2c, C2a. The GND 48 is an electrically-conductive structural member of the seat 40. The electrode plate 62 is on the seat at least at a time of testing. The multiple capacitors C2c, C2a are electrically connected between the electrode plate 62 and the GND 48, and are different in electrostatic capacity from each other. The testing method further includes: a switch step of selecting and switching one capacitor of the capacitors C2c, C2a; and a determination result check step of determining, while switching the one capacitor, whether a signal outputted from the occupant detection sensor is a determination result corresponding to the switched one capacitor.

According to the above testing apparatus and method, by switching the capacitors C2c, C2a using the switch 24, it is possible to simulate situations where an occupant (human) is seated, and the CRS is mounted. Therefore, it is possible to test the occupant detection sensor in a simply way. For example, the determination result check portion 22 can determine whether the occupant detection sensor normally operates, only by determining whether the determination result corresponds to "AF05" or whether the determination result corresponds to "CRS+1YO infant" (see FIG. 6 for the first cycle and the second cycle).

The above testing apparatus may further include: an apparatus body (e.g., load mechanism 30); and an insulator 50 disposed between the electrode plate 62 and the apparatus body (see also FIGS. 1, 4, 6). According to this configuration, it is possible to prevent the electrode plate 62 and the load mechanism 30 from being electrically connected with each other. Thus, an electrostatic capacity of a simulated occupant can be detected by the occupant detection sensor 70 with improved accuracy. The electrostatic capacity of the simulated occupant corresponds to the electrostatic capacity C1 generated between the electrode plate 62 and the occupant detection sensor mat 71.

The above testing apparatus may further include a load application portion 21 that applies a predetermined load against the occupant detection sensor 70 (e.g., the electrode plate 62) at the time of testing (see also FIGS. 2, 4, 6). The above testing method may further include applying a predetermined load against the occupant detection sensor 70 at the time of testing. According this testing apparatus and method, it is possible to apply the load against the occupant detection sensor 70 (e.g., occupant detection sensor mat 71), and it is possible to test the occupant detection sensor 70 by simulating a state where an occupant is actually seated with high precision. Therefore, it is possible to improve test accuracy.

The above testing apparatus and method may be configured as follows. When a capacitive coupling Cm is generated between the apparatus body and the electrode plate 62, the electrostatic capacity C2 of each of the multiple capacitors C2c, C2a is corrected with the capacitive coupling Cm, so that each of the multiple capacitors C2c, C2a has a corrected electrostatic capacity Cr (see equations (2)). According to this configuration, it is possible to test the occupant detection sensor 70 in accordance with an actual condition of the insulator. Therefore, it is possible to improve test accuracy.

The above testing apparatus may be configured as follows. A configuration of the insulator 50 is adjusted, so that an electrostatic capacity of the capacitive coupling Cm becomes smaller than a smallest one (C2c in the above-described configuration) of capacities of the multiple capacitors C2c, C2a. According to this configuration, because magnitude of the capacitive coupling Cm can be reduced as small as possible, it is possible to minimize the influence on the test result. Therefore, it is possible to improve test accuracy.

The above testing apparatus may further include: an insulating plate 64 that has a predetermined thickness and is disposed on an occupant-detection-sensor-side surface of the electrode plate 62, so that the insulating plate 64 is disposed between the electrode plate 62 and the occupant detection sensor 70. According to this configuration, it becomes possible to test the occupant detection sensor 70 in accordance with an actual condition of usage of the seat 40. Therefore, it is possible to improve test accuracy. Furthermore, the use of the insulator 50 can reduce the influence on the test electrostatic capacity Ct.

The above testing apparatus may be configured as follows. The insulating plate 64 has a rounded peripheral edge portion 64a on an occupant detection sensor 70 side (on an occupant detection sensor mat 71 side) (see FIGS. 1 to 4). According to this configuration, since the peripheral edge portion 64a is rounded, the insulating plate 64 resembles a human hip in contacting the seat 40 (seat cover). It is possible to prevent the electrode plate 62 from contacting the seat 40. Therefore, because it is possible to test in conditions close to the reality, it is possible to improve test accuracy.

The above testing apparatus may be configured as follows. The seat 40 may be a seat 40 for use in a vehicle. The ground may be a GND 48 or a seat frame 49, each of which is an electrically-conductive structural member of the seat 40 (see FIGS. 1 to 4). According to this configuration, it is possible to test the occupant detection sensor 70 in actual conditions where the occupant detection sensor 70 is mounted to the seat 40 for use in a vehicle. It is possible to improve test accuracy.

Second Embodiment

Figure 7:
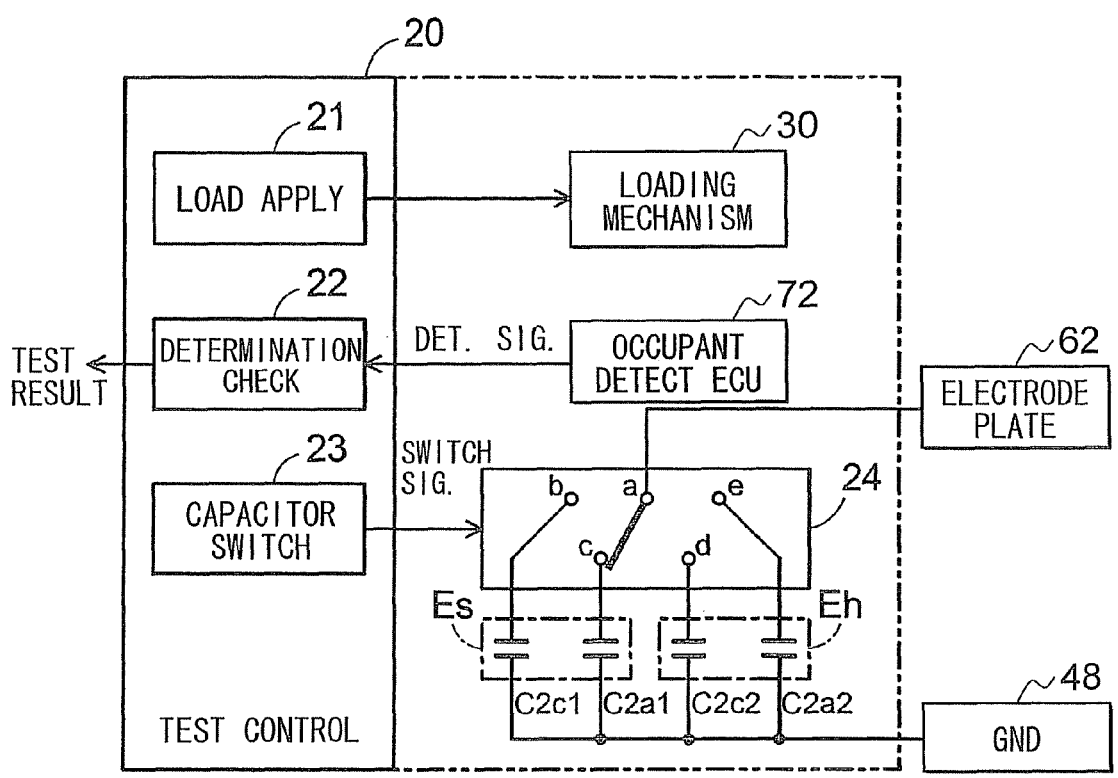
FIG. 7 is a diagram illustrating a second configuration of the test controller.
Figure 8A:
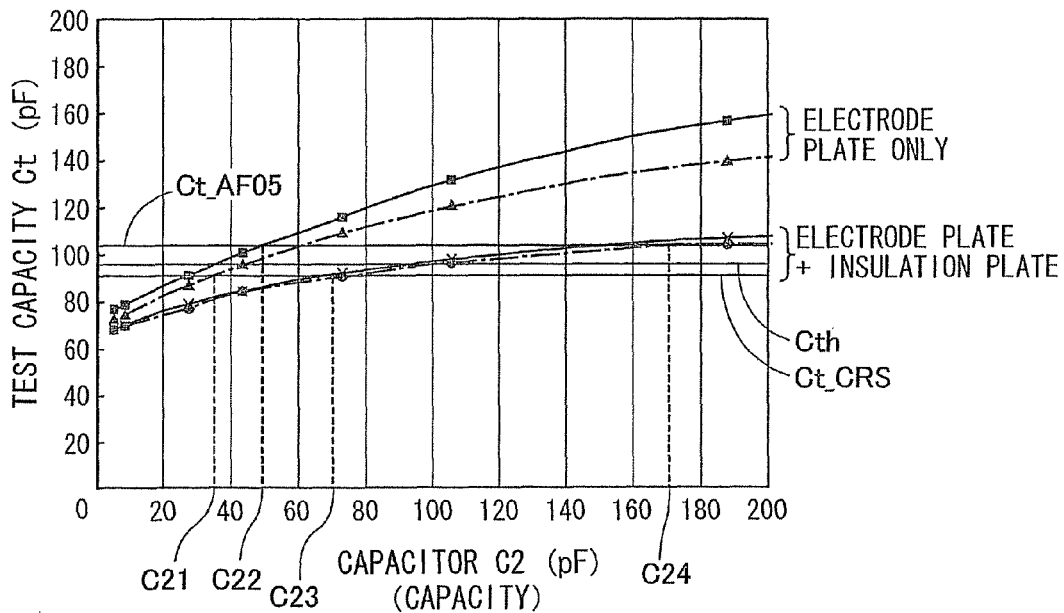
FIGS. 8A, 8B and 8c are diagrams for explaining an electrostatic capacity different between seat cover hardness and softness.
Figure 8B:
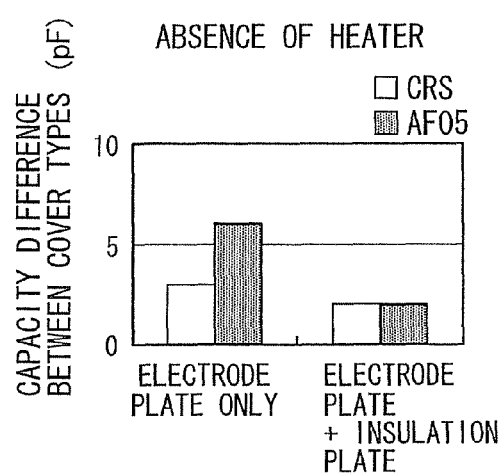
Figure 8C:
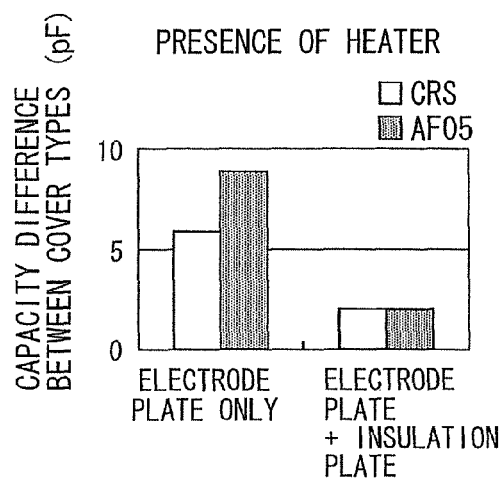
Figure 9:
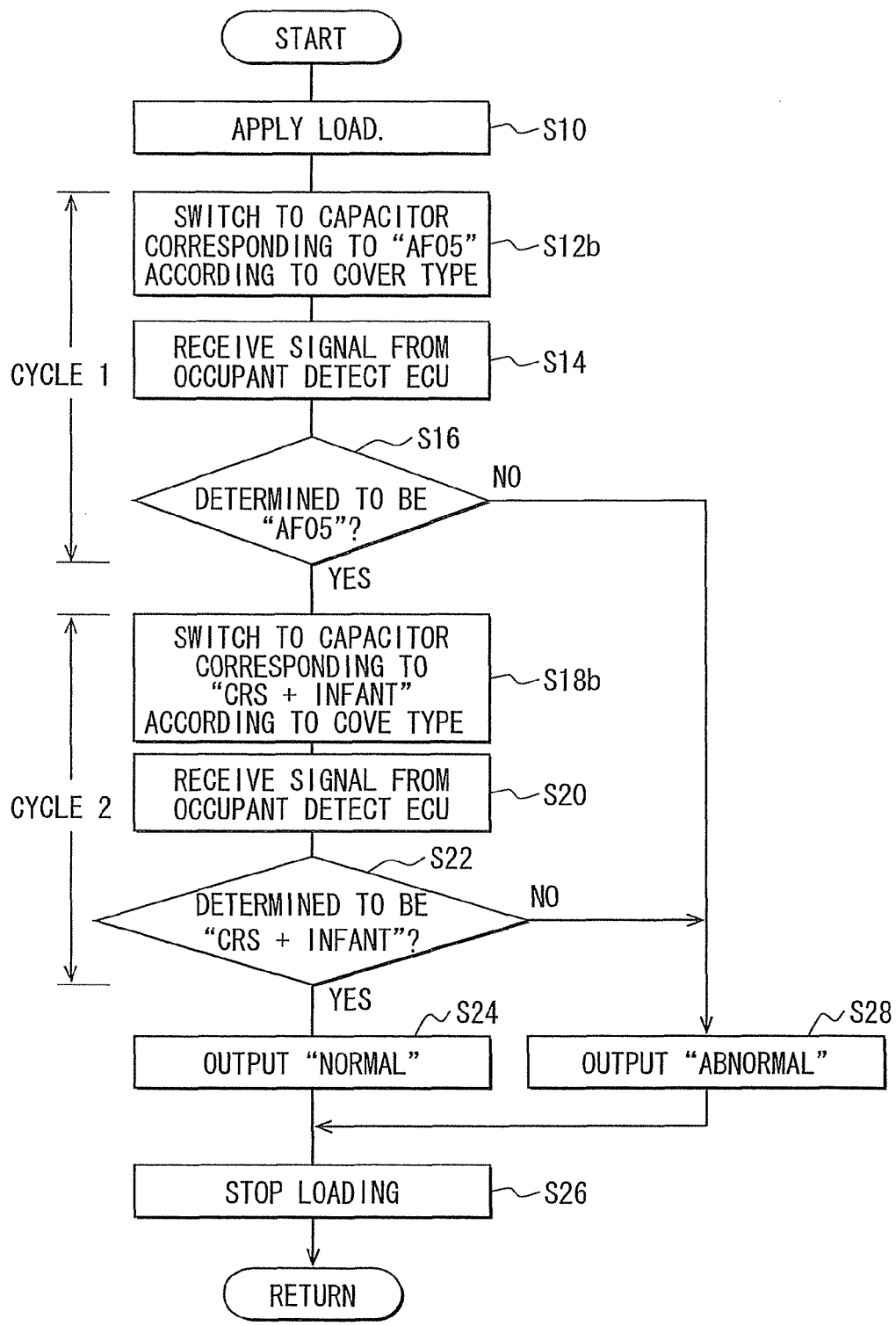
FIG. 9 is a flowchart illustrating a second procedure of the sensor testing process.

A second embodiment is directed to an example of a testing apparatus and method for testing the occupant detection sensor by taking into account a seat cover. The second embodiment will be described with reference to FIGS. 7 to 9. FIG. 7 schematically shows a second configuration of the test controller. FIG. 8 illustrates an electronic capacity difference between a hard seat cover and a soft seat cover. FIG. 9 is a flowchart illustrating a procedure example of a sensor testing process. For simplification of drawings and description, a difference from the first embodiment will be described. Between the first and second embodiments, like reference numerals are used to refer to like parts or steps. Explanation on like parts or steps may be omitted.

The second configuration illustrated in FIG. 7 can differ from the first configuration illustrated in FIG. 4 in, for example, the following points. First, capacitors C2c, C2a are arranged in accordance with types of cover (seat cover). Specifically, the sensor testing apparatus is equipped with the capacitors C2c1, C2a1 corresponding to a soft cover Es and the capacitors C2c2, C2a2 corresponding to a hard cover Eh. Covers are classified into the soft cover Es and the hard cover Eh according to shrinkage rate. That is, if a shrinkage rate of a cover is larger than a predetermined threshold, the cover is classified into the soft cover Es. If a shrinkage rate of a cover is smaller than the predetermined threshold, the cover is classified into the hard cover Eh. Second, based on the switch signal transmitted from the capacitor switching portion 23, the switch 24 selects one capacitor from the multiple capacitors C2c1, C2a1, C2c2 and C2a2, and switches the selected one capacitor. That is, one terminal is selected from multiple terminals "b", "c", "d" and "e", and a target capacitor (selected capacitor) is connected.

Classification into the soft cover Es and the hard cover Eh will be described with reference to FIGS. 8A and 8B. FIG. 8A is a graph illustrating a relation between the electrostatic capacity C2 and the test electrostatic capacity Ct. The horizontal axis of the graph shows the electrostatic capacity C2 of a capacitor, and the vertical axis shows the test electrostatic capacity Ct. FIG. 8B illustrates an electrostatic capacity difference in the case of the absence of a heater. FIG. 8C illustrates an electrostatic capacity difference in the case of the presence of the heater.

In FIG. 8A, the solid line shows the relation of the soft cover Es. The dashed-dotted line shows the relation of the hard cover Eh. Further, for each of the relations of the soft cover Es and the hard cover Eh, FIG. 8A shows two cases; the electrode plate 62 is used not together with the insulation plate 64; and the electrode plate 62 is used together with the insulation plate 64. In any one of these cases, the electrostatic capacity C2 of the capacity increases when the test electrostatic capacity Ct increases. The soft cover Es increases with a slightly-larger rate than the hard cover Eh. The rate of increase is larger when the electrode plate 62 is used not together with the insulation plate 64 than when the electrode plate 62 is used together with the insulation plate 64.

As shown in FIG. 8A, when only the electrode plate 62 is used, the electrostatic capacity C2 for the infant (e.g., CRS+1YO infant) is set to the electrostatic capacity C21. When the electrode plate 62 and the insulation plate 64 are used, the electrostatic capacity C2 for the infant (e.g., CRS+1YO infant) is set to the electrostatic capacity C23. Likewise, when only the electrode plate 62 is used, the electrostatic capacity C2 for the adult is set to the electrostatic capacity C22. When the electrode plate 62 and the insulation plate 64 are used, the electrostatic capacity C2 for the adult is set to the electrostatic capacity C24. In the above settings, the electrostatic capacity C2 has a value shown by the dashed line, and a threshold electrostatic capacity Cth is usable as a determination threshold, as shown in FIG. 8A. When the electrostatic capacity C2 is set to C21, C23, the test electrostatic capacity Ct when the occupant detection sensor 70 is normal becomes an infant electrostatic capacity Cth_CRS. Likewise, when the electrostatic capacity C2 is set to C22, C24, the test electrostatic capacity Ct when the occupant detection sensor 70 is normal becomes an adult electrostatic capacity Cth_AF05.

When FIG. 8B and FIG. 8C are compared, it is clear that, depending on the presence or absence of the heater, the electrostatic capacity difference exceeds or does not exceed a predetermined electrostatic capacity difference (e.g., 5 pF in FIGS. 8B and 8C). Specifically, in the case of AF05 with use of only the electrode plate 62, the electrostatic capacity difference between the cover types is large. When the electrode plate 62 and the insulation plate 64 are used, the electrostatic capacity difference is small regardless of the presence and absence of the heater. This result indicates that it may be preferable that the electrode plate 62 be equipped with the insulation plate 64. When only the electrode plate 62 is used, it may be necessary to make a correction in accordance with the electrostatic capacity difference. A manner of such correction will be described later with reference to FIG. 12.

An example procedure of a sensor testing process performed by the sensor testing apparatus 10 (in particular, the test controller 20) will be described with reference to FIG. 9. Step S12b and S18b shown in FIG. 9 can correspond to a switch step preformed by the capacitor switching portion 23.

The sensor testing process shown in FIG. 9 is an alternative to the sensor testing process shown in a FIG. 6. Differences between FIG. 6 and FIG. 9 include a manner of switching a capacitor by the capacitor switching portion 23 (see S12b, S18b). Specifically, at S12b, the capacitor switching portion 23 switches either one of the capacitors C2a1 and C2a2 depending on whether the cover is the soft seat Es or the hard seat Eh. It should be noted that above capacitors C2a1 and C2a2 correspond to the adult. At S18b, the capacitor switching portion 23 switches to either one of the capacitors C2c1 and C2c2 depending on whether the cover is the soft seat Es or the hard seat Eh. It should be noted that the above capacitors C2c1 and C2c2 correspond to "CRS+1YO infant". Other steps in FIG. 9 can be the same as those in FIG. 6.

The above-described second embodiment can have the following configurations and advantages in addition to those described in the first embodiment.

The multiple capacitors of the testing apparatus may include a group of capacitors C2c1, C2a1, C2c2, C2a2 whose capacities are different from each other according to type of seat cover. The types of seat cover include the soft seat cover Es and the hard seat cove Eh (see FIG. 7). According to this configuration, the electrostatic capacities of the multiple capacitors C2c1, C2a1, C2c2, C2a2 are set to meet the types of seat cover. Therefore, it is possible to test the occupant detection sensor 70 while the seat 40 is being brought closer to an actual seat. It is possible to improve test accuracy.

The multiple capacitors of the testing method may include a group of capacitors C2c1, C2a1, C2c2 and C2a2 whose capacities are different from each other according to type of seat cover. The types of seat cover include soft seat cover Es or hard seat cove Eh (see FIG. 7). Depending on whether the seat cover is the soft seat cover Es or the hard seat cover Eh, the capacitor switching portion 23 selects and switches one capacitor of the multiple capacitors C2c1, C2a1, C2c2 and C2a2 at the switch step (see S12a, S18a in FIG. 9). According to this configuration, because the electrostatic capacities of the multiple capacitors C2c1, C2a1, C2c2 and C2a2 are set to meet the types of seat cover, it is possible to test the occupant detection sensor 70 in a situation close to an actual situation of the seat 40. Therefore, it is possible to improve test accuracy.

Third Embodiment

Figure 10A:
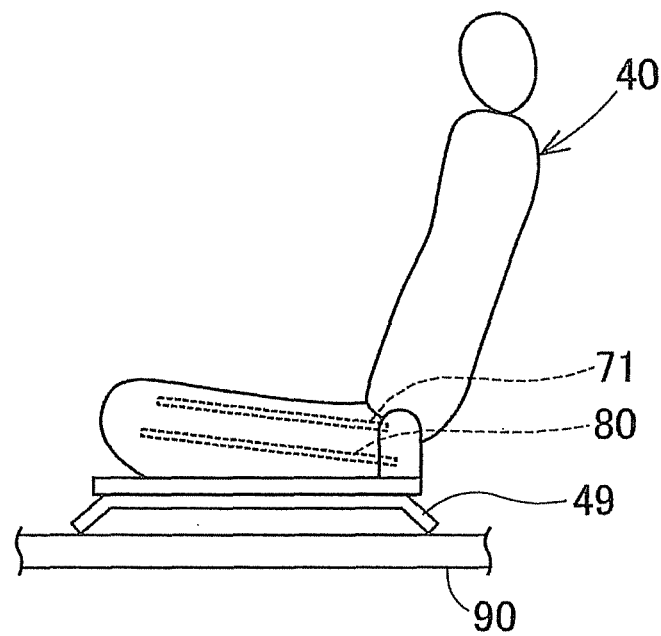
FIG. 10A is a side view illustrating a seat equipped with a heater.
Figure 10B:
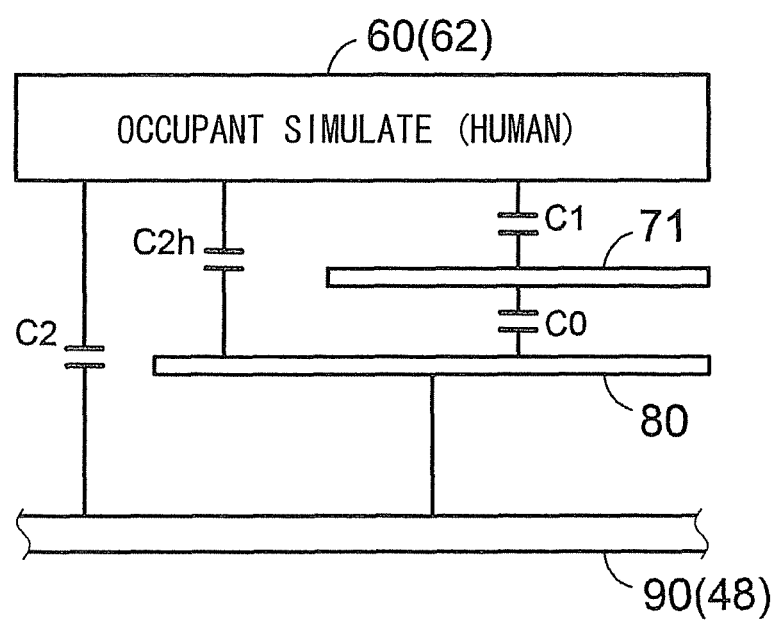
FIG. 10B is a diagram illustrating electrostatic capacities between elements.
Figure 11:
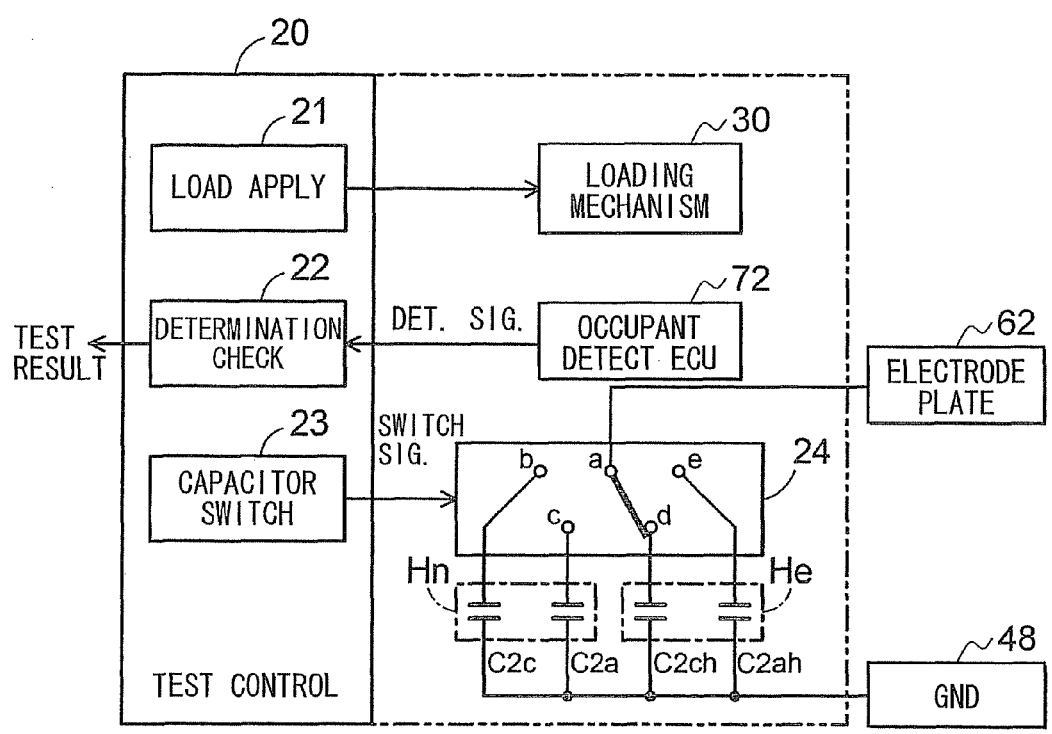
FIG. 11 is a diagram illustrating a third configuration of the test controller.
Figure 12:
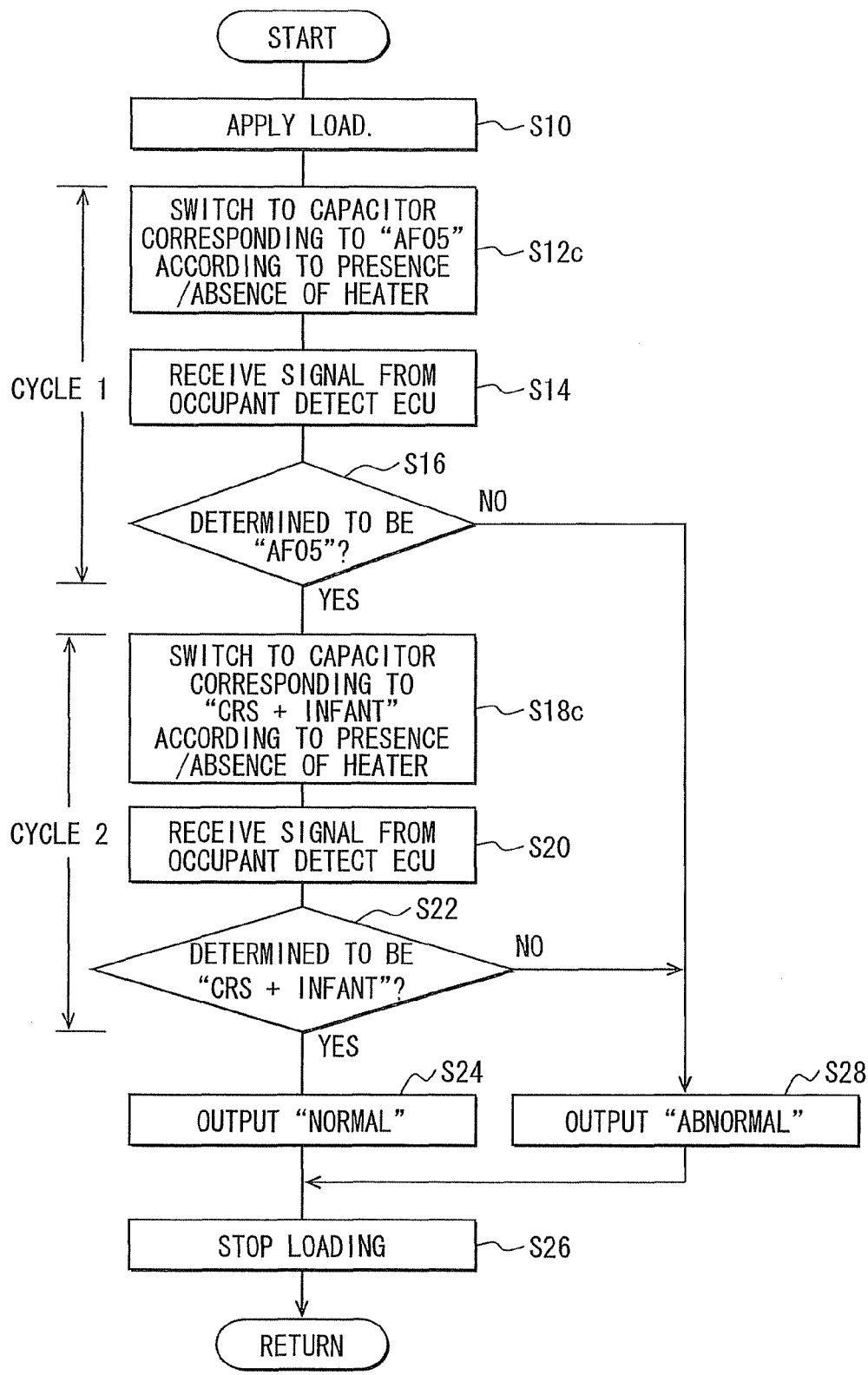
FIG. 12 is a flowchart illustrating a third procedure of the sensor testing process.

A third embodiment is directed to a testing apparatus and method for testing the occupant detection sensor by taking into account a presence and absence of a heater. The third embodiment will be described with reference to FIGS. 10A to 12. FIG. 10A illustrates a configuration of a seat equipped with a heater. FIG. 10B illustrates electrostatic capacities in the seat equipped with the heater. FIG. 11 illustrates a third configuration of the test controller. FIG. 12 is a flow chart partly illustrating an example procedure of the sensor testing process. For simplification of illustration and description, a difference from the first and second embodiments will be described. Among the first to third embodiments, like reference numerals are used to refer to like parts or steps. Explanation on like parts and like steps may be omitted.

A side view of the seat equipped with the heater is illustrated in FIG. 11A. Electrostatic capacities between elements generated by the presence of the heater are illustrated in FIG. 11B. As shown in FIG. 11A, the heater 80 is located on an opposite side of the occupant detection sensor mat 71 from the seating surface 46a. Specifically, the heater 80 is located on a lower side of the occupant detection sensor mat 71. As shown in FIG. 10B, a case of the heater 80 is connected to the GND 48. In this configuration, an electrostatic capacity $C2h$ is generated between the heater 80 and the occupant simulator 60 (specifically, the electrode plate 62) equivalently. The electrostatic capacity $C2h$ has a parallel connection relation with the electrostatic capacity of the capacitor that is switchably connected between the occupant simulator 60 and the GND 48 by the switch 24. That is, since the seat 40 is equipped with the heater 80, the electrostatic capacity $C2h$ is generated additionally.

An outline of measures against the additionally-generated electrostatic capacity $C2h$ will be described. The electrostatic capacities of the multiple capacitors $C2c$, $C2a$ are made different depending on the presence and absence of the heater 80 (see FIG. 11).

Details of the measures against the electrostatic capacity $C2h$ will be described with reference to FIGS. 11 and 12. The test controller 20 in FIG. 11 is an alternative to the test controller 20 in FIGS. 4 and 7. Specifically, the test controller 20 in FIG. 11 includes capacitors $C2ch$, $C2ah$ in addition to the capacitors $C2c$, $C2a$ illustrated in FIG. 4. When there is not the heater 80, the capacitors $C2c$, $C2a$ are selected. When there is the heater 80, the capacitors $C2ch$, $C2ah$ are selected. As described above, the presence of the heater 80 generates the additional electrostatic capacity $C2h$. Thus, the employed capacitors $C2ch$, $C2ah$ are smaller in electrostatic capacity than the capacitors $C2c$, $C2a$ by the electrostatic capacity $C2h$. That is, regarding an electrostatic capacity, a relation "$C2ch=C2c-C2h$" and a relation "$C2ah=C2a-C2h$" are satisfied.

In the configuration illustrated in FIG. 11, the capacitor switching portion 23 may switch the capacitor $C2c$, $C2a$, $C2ch$, $C2ah$ in accordance with the presence or absence of the heater 80. At S12c of the sensor testing process illustrated in FIG. 12, one of the capacitors $C2a$, $C2ah$ is switched in accordance with the presence or absence of the heater 80. At S18c, one of the capacitors $C2c$, $C2ch$ is switched in accordance with the presence or absence of the heater 80. Other steps can be the same as those in the second embodiment.

The third embodiment can have the following configurations and advantages in addition to those in the first and second embodiments.

The multiple capacitors includes a group of capacitors $C2c$, $C2a$, $C2ch$, $C2ah$ whose electrostatic capacities are different from each other according to the presence and absence of the heater 80 (see FIG. 11). At the switch step, the capacitor switching portion 23 selects and switches one of the capacitors $C2c$, $C2a$, $C2ch$, $C2ah$ in accordance with test purpose (see FIG. 12). According to this configuration, the multiple capacitors $C2c$, $C2a$, $C2ch$, $C2ah$ are switched in accordance with the presence and absence of the heater 80, and it is determined whether the occupant detection sensor 70 normally operates. Therefore, it is possible to test the occupant detection sensor 70 pursuant to actual conditions of the seat 40. It is possible to improve test accuracy.

Other Embodiments

Embodiments of the present invention are not limited to the above-described first, second and third embodiments, and can have various forms. Examples of other embodiments will be described.

Figure 13A:
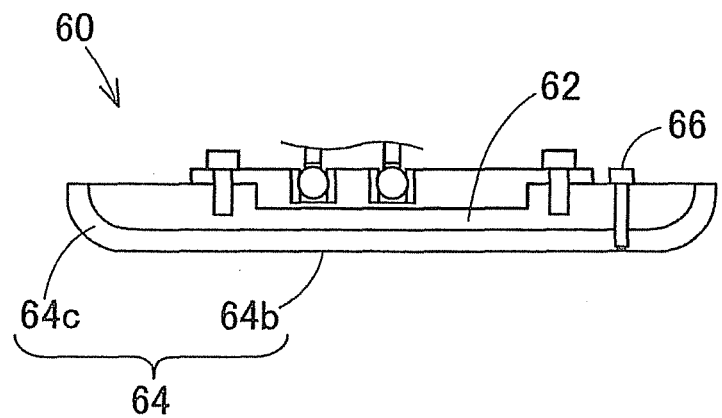
FIG. 13A is a side view illustrating a second configuration of the occupant simulator.
Figure 13B:
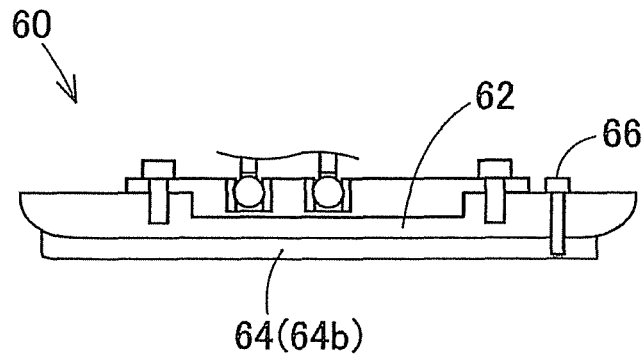
FIG. 13B is a side view illustrating a third configuration of the occupant simulator.
Figure 13C:
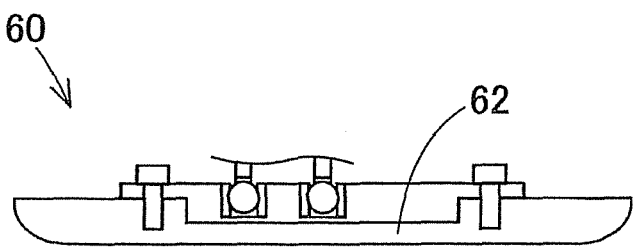
FIG. 13C is a side view illustrating a fourth configuration of the occupant simulator.

In the first, second and third embodiments, the occupant simulator 60 is equipped with the electrode plate 62 and the insulation plate 64. The insulation plate 64 includes the peripheral edge portion 64a, which is rounded at a predetermined curvature (see FIG. 3A). Alternatively, the occupant simulator 60 may have a second configuration, a third configuration or a fourth configuration, as shown in FIGS. 13A to 13C. According to the second configuration of the occupant simulator 60 illustrated in FIG. 13A, the peripheral edge portion 64a further covers a side surface of the electrode plate 62 in addition to a rounded corner of the electrode plate 62. According to the third configuration of the occupant simulator 60 illustrated in FIG. 13B, the insulation plate 64 includes only the flat plate portion 64b. According to the fourth configuration of the occupant simulator 60 illustrated in FIG. 13C, the occupant simulator 60 includes only the electrode plate 62. In any one of the above configurations, since it is possible to switch one of the multiple capacitors and test the occupant detection sensor 70, it is possible to achieve substantially the same advantages as those in the first, second and third embodiments.

In the first, second and third embodiment, a seat for use in a vehicle applies to the seat 40 (see FIGS. 1 and 2). Alternatively, other seats may apply to the seat 40. Other seats may include, for example, a seat for use in vassal, a seat for use in aircraft, a seat for use in railway vehicle, or the like. That is, all of seats mountable to a transport machine are applicable to the seat 40. Because application of other seats merely changes an object equipped with the occupant detection sensor 70, it is possible to achieve the same advantages as those in the first, second and third embodiments.

In the first, second and third embodiment, a capacitive sensor applies to the occupant detection sensor 70 (see FIGS. 2A, 2B and 4). Alternatively, other capacitive sensors capable of detecting the seating may apply to the occupant detection sensor 70. Because types of capacitive sensor merely differ, it is possible to achieve the same advantages as those in the first, second and third embodiments.

In the first, second and third embodiment, the electrostatic capacities of the multiple capacitors include an electrostatic capacity corresponding to "CRS+1YO infant" and an electrostatic capacity corresponding to "AF05". The "CRS+1YO infant" model corresponds to a body type model representing a combination of the one years old infant and the CRS. The "AF05" model corresponds to US adult female. Alternatively, other body type models may be used. Other body type models include, for example, a "CRS+3YO infant" model, a "JF05" model, a "JM50" model, and the like. The "CRS+3YO infant" model corresponds to a 3 years old infant on a CRS seated on a seat. The "JF05" model corresponds to a 5% light weight in a normal distribution of Japanese adult female. The "JM50" model corresponds to a 50% light weight in a normal distribution of Japanese adult male. In any one of the body type models, when the multiple capacitors include a set of capacitors having capacities corresponding to the any one of the body type models, it is possible to achieve the same advantages as those in the first, second and third embodiments.

In the first, second and third embodiment, the insulation plate 64 is fixed to the electrode plate 62 by using the fixing member 66 such as a bolt, a screw and the like (see FIG. 3). Alternatively, the insulation plate 64 is fixed to the electrode plate 62 by adhering, compression bonding or the like. Alternatively, the insulation plate 64 and the electrode plate 62 are formed as a single piece in manufacturing. In any one of the above configurations, because of the presence of the electrode plate 62 and the insulation plate 64, it is possible to achieve the same advantages as those in the first, second and third embodiments.

In the second embodiment, one of the multiple capacitors C2c1, C2a1, C2c2, C2a2 is switched in accordance with the type of cover seat (see S12b, S18b in FIG. 9). In the third embodiment, one of the multiple capacitors C2c1, C2a1, C2ch, C2ah is switched in accordance with the presence or absence of the heater 80 (see S15, S12c in FIG. 18c). Alternatively (additionally), one of the multiple capacitors may be switched in accordance with humidity in environments of the seat 40. For example, the humidity is high in a rainy season and is low in a dry season. A humidity change leads to a change in electrostatic capacity between the seat 40 and the GND 48. According to this configuration, it is possible test the occupant detection sensor appropriately by taking into account the humidity.

In the above testing apparatus or method, the multiple capacitors may include a group of capacitors whose electrostatic capacities are different from each other according to humidity. According this configuration, since it is possible to test the occupant detection sensor in accordance with the humidity, it is possible to improve test accuracy.

According to a first example of the embodiments, a testing apparatus for testing whether an occupant detection sensor, which determines an occupant based on magnitude of electrostatic capacity of the occupant on a seat, normally operates can be configured as follows. The testing apparatus includes: a ground that is an electrically-conductive structural member of the seat; an electrode plate that is electrically-conductive and is on the seat at a time of testing; a plurality of capacitors that is electrically connected between the electrode plate and the ground and is different in electrostatic capacity from each other; a switch mechanism that selects and switches one capacitor of the plurality of capacitors; and a determination result check portion that determines, while switching the one capacitor by the switch mechanism, whether a signal outputted from the occupant detection sensor is a determination result corresponding to the switched one capacitor.

According to the above configuration, by switching the capacitors, it is possible to simulate situations where an occupant (human) is seated on the seat or a child restraint system is mounted on the seat. Therefore, it is possible to test the occupant detection sensor in a simple way. For each capacitor, the determination result check portion may make a determination as to whether a signal outputted from the occupant detection sensor is a determination result corresponding to the each capacitor. By making this determination only, it is possible to test whether the occupant detection sensor operates normally.

It should be noted that the seat includes arbitrary seat on which an occupant can be seated regardless of body type models. The ground (GND) may mean a common electronic potential provider (equi-potential ground). When grounded, it has zero V. The capacitor may mean not only a capacitor but also other charge discharge means. The electrostatic capacities of the capacitors may be appropriately set in accordance with the body type models to be simulated. For example, as for an infant, the electrostatic capacity may be set to correspond to a combination of the infant body type model and the child restraint system (CRS). As for an non-infant (adult), the electrostatic capacity may be set to correspond to "AF05" (a lighter weight female at 5% in a normal distribution of US adult female weight). Shape of the electrode plate is arbitrary. For example, the electrode plate may have a flat plate shape, a human-hip-like shape etc.

The above testing apparatus may be configured to further include: an apparatus body; and an insulator that is disposed between the electrode plate and the apparatus body. According to this configuration, it is possible to prevent the electrode plate and the apparatus body from being electrically connected to each other. The electrostatic capacity, which is to be detected by the occupant detection sensor under simulated environments, can be set with the improved accuracy. That is, the electrostatic capacity between the electrode plate and the occupant detection sensor can be set with high accuracy.

The testing apparatus may be configured to further include a load application portion that applies a predetermined load against the occupant detection sensor at the time of testing. According to this configuration, since the load is applied to the occupant detection sensor, it is possible to test the occupant detection sensor while simulating a situation where the occupant is actually being seated. Because it is possible to test the occupant detection sensor in conditions close to the reality, it is possible to improve test accuracy. In the above, the predetermined load may be a constant weight regardless of the body type models. Alternatively, the predetermined load may be weights adjusted to the body type models.

The above testing apparatus may be configured such that: when a capacitive coupling is generated between the apparatus body and the electrode plate, the electrostatic capacity of each of the plurality of capacitors is corrected with the capacitive coupling. Since the insulator is disposed between the electrode plate and the apparatus body, it is possible to suppress generation of capacitive coupling. However, depending on a form (e.g., thickness etc.) or a coupling manner of the insulator, the capacitive coupling may be generated in some cases. In the above configuration, the electrostatic capacity of each of the plurality of capacitors is corrected in consideration of the capacitive coupling. Since it is possible to test the occupant detection sensor in accordance with actual conditions of the insulator, it is possible to improve test accuracy.

The above testing apparatus may be configured as follows. The corrected electrostatic capacity Cr of each of the plurality of capacitors is expressed as:

$$Cr = \frac{C2}{1 - Cm \cdot C2}$$

where C2 is the uncorrected electrostatic capacity of the each of the plurality of capacitors, and Cm is an electrostatic capacity of the capacitive coupling. According to this configuration, simple calculation is sufficient to obtain the required electrostatic capacity of the capacitor.

The above testing apparatus may be configured such that: a configuration of the insulator is adjusted, so that an electrostatic capacity of the capacitive coupling is smaller than a smallest one of respective capacities of the plurality of capacitors. According to this configuration, it is possible to minimize an influence on a test result. It is therefore possible to improve test accuracy. In the above, the configuration of the insulator may include, for example, shape, material, or the like. If the insulator is in a plate form, the configuration of the insulator may include the number of stacked plates.

The above testing apparatus may be configured such that: the plurality of capacitors includes a group of capacitors whose electrostatic capacities are different from each other according to type of seat cover. When the seat cover varies, the test electrostatic capacity varies. According to this configuration, it is possible to set the electrostatic capacity of each capacitor in accordance with the type of seat cover. Since it is possible to test the occupant detection sensor in accordance with actual conditions of the seat, it is possible to improve test accuracy.

The above testing apparatus may be configured such that: the plurality of capacitors includes a group of capacitors whose electrostatic capacities are different from each other according to a presence and an absence of a heater including a case connected to the ground. Since the heat has the same electronic potential as the ground, the test electrostatic capacity varies depending on the presence or absence of the heater. According to this configuration, the electrostatic capacities of the plurality of capacitors are made different according to the presence or absence of the heater. Since it is possible to test the occupant detection sensor in accordance with actual conditions of the seat, it is possible to improve test accuracy.

The above testing apparatus may be configured to further include: an insulating plate that has a predetermined thickness and is disposed on an occupant-detection-sensor-side surface of the electrode plate, so that the insulating plate is disposed between the electrode plate and the occupant detection sensor. For example, when an individual (e.g., infant etc.) is seated at a position spaced apart from the seating surface via a child restraint system (CRS), the test electrostatic capacity varies as compared with when the individual is directly seated on the seating surface. According to the above configuration, the insulating plate having the predetermined thickness is disposed between the electrode plate and the occupant detection sensor. Therefore, it is possible to test the occupant detection sensor in accordance with usage conditions of the seat, and therefore, it is possible to improve test accuracy. Furthermore, since the insulating plate is used, it is possible to suppress an influence on the test electrostatic capacity.

The above testing apparatus may be configured such that: the insulating plate covers a side surface of the electrode plate as well as the occupant-detection-sensor-side surface of the electrode plate. According to this configuration, since the side surface of the electrode plate is covered with the insulating plate, even if the seat is sub ducted by the load, the electrode plate is prevented from directly contacting the seat (seat cover). Thus, a change in the test electrostatic capacity due to the direct contact between the electrode plate and the seat is prevented. Therefore, it is possible to test the occupant detection sensor in conditions close to the reality. It is possible to improve test accuracy.

The above testing apparatus may be configured such that: the insulating plate has a rounded peripheral edge portion on an occupant detection sensor side. According to this configuration, since the peripheral edge portion of the insulating plate is rounded, the shape of the insulating plate is close to a hip shape when the insulating plate contacts the seat. The electrode plate is prevented from contacting the seat. Therefore, it is possible to test the occupant detection sensor in conditions close to the reality. It is possible to improve test accuracy. Furthermore, since the peripheral edge portion is not angular, the seat cover is not damaged.

The above testing apparatus may be configured such that: the seat is a seat for use in a vehicle; and the ground is an electrically-conductive frame of the seat. According to this configuration, it is possible to test the occupant detection sensor in accordance with actual conditions of the seat for use in a vehicle. It is possible to improve test accuracy.

According to a second example of the embodiments, a testing method for testing whether an occupant detection sensor, which determines an occupant based on magnitude of electrostatic capacity of the occupant on a seat, normally operates is provided. The testing method comprises: preparing a testing apparatus that includes a ground that is an electrically-conductive structural member of the seat, an electrode plate that is electrically-conductive and is on the seat at a time of testing and, and a plurality of capacitors that is electrically connected between the electrode plate and the ground; a switch step of selecting and switching one capacitor of the plurality of capacitors; and a determination result check step of determining, while switching the one capacitor at the switch step, whether a signal outputted from the occupant detection sensor is a determination result corresponding to the switched one capacitor.

According to the above method, by switching the capacitor at the switch step, it is possible to simulate situations in which the passenger (human) is seated or the child restraint system is mounted. Because of this, only by electrical switching the capacitor, it is possible to perform the testing in a simple manner. It is possible to determine whether the occupant detection sensor normally operates, only by determining whether the signal outputted from the occupant detection sensor is the determination result corresponding to each capacitor.

The above testing method may be provided as follows. The testing apparatus further includes: an apparatus body; and an insulator that is disposed between the electrode plate and the apparatus body. According to the above, it is possible to prevent the electrode plate and the apparatus body from being electrically connected to each other. With the improved accuracy, it is possible to set the electrostatic capacity to be detected by the occupant detection sensor under simulated environment. That is, the electrostatic capacity between the electrode plate and the occupant detection sensor can be set with high accuracy.

The above testing method may further include: a load application stem of applying a predetermined load against the occupant detection sensor at the time of testing. According to this, since the load is applied to the occupant detection sensor, it is possible to test the occupant detection sensor while simulating a situation where the occupant is actually being seated. Because it is possible to test the occupant detection sensor in conditions close to the reality, it is possible to improve test accuracy.

The above testing method may be provided as follows. When a capacitive coupling is generated between the apparatus body and the electrode plate, the electrostatic capacity of each of the plurality of capacitors is corrected with the capacitive coupling. According to this, the electrostatic capacity of each of the plurality of capacitors is corrected in consideration of the capacitive coupling. Since it is possible to test the occupant detection sensor in accordance with actual conditions of the insulator, it is possible to improve test accuracy.

The above testing method may be configured as follows: the plurality of capacitors includes a group of capacitors whose electrostatic capacities are different from each other according to one of or both of (i) type of seat cover and (ii) a presence and an absence of a heater arranged inside the seat and electrically connected to the ground. The one capacitor of the plurality of capacitors is selected and switched in accordance with test purpose. According to this configuration, the electrostatic capacities of the plurality of capacitors are set in accordance with (i) the types of cove seat or (ii) the presence or absence of the heater. Therefore, it is possible to test the occupant detection sensor in conditions close to actual conditions of the seat, and it is possible to improve the test accuracy.

While the invention has been described above with reference to various embodiments thereof, it is to be understood that the invention is not limited to the above described embodiments and constructions. The invention is intended to cover various modifications and equivalent arrangements.

What is claimed is:

1. A testing apparatus for testing whether an occupant detection sensor normally operates, wherein the occupant detection sensor determines an occupant based on a magnitude of electrostatic capacity of the occupant on a seat, the testing apparatus comprising:
    a ground that is an electrically-conductive structural member of the seat;
    an electrode plate that is electrically-conductive and is on the seat at a time of testing;
    a plurality of capacitors that is electrically connected between the electrode plate and the ground and where each of the plurality of capacitors is different in electrostatic capacity;
    a switch mechanism that selects and switches one capacitor of the plurality of capacitors; and
    a determination result check portion that determines, while switching the one capacitor by the switch mechanism, whether a signal outputted from the occupant detection sensor is a determination result corresponding to the switched one capacitor.

2. The testing apparatus according to claim 1, further comprising:
    an apparatus body; and
    an insulator that is disposed between the electrode plate and the apparatus body.

3. The testing apparatus according to claim 1, further comprising:
    a load application portion that applies a predetermined load against the occupant detection sensor at the time of testing.

4. The testing apparatus according to claim 2, wherein:
    when a capacitive coupling is generated between the apparatus body and the electrode plate, the electrostatic capacity of each of the plurality of capacitors is corrected with the capacitive coupling.

5. The testing apparatus according to claim 4, wherein:
    the corrected electrostatic capacity Cr of each of the plurality of capacitors is expressed as:

$$Cr = \frac{C2}{1 - Cm \cdot C2}$$

where C2 is the uncorrected electrostatic capacity of the each of the plurality of capacitors, and Cm is an electrostatic capacity of the capacitive coupling.

6. The testing apparatus according to claim 4, wherein:
    a configuration of the insulator is adjusted, so that an electrostatic capacity of the capacitive coupling is smaller than a smallest one of capacities of the plurality of capacitors.

7. The testing apparatus according to claim 1, wherein:
    the plurality of capacitors includes a group of capacitors whose electrostatic capacities are different from each other according to a type of seat cover.

8. The testing apparatus according to claim 1, wherein:
    the plurality of capacitors includes a group of capacitors whose electrostatic capacities are different from each other according to a presence and an absence of a heater including a case connected to the ground.

9. The testing apparatus according to claim 1, further comprising:
    an insulating plate that has a predetermined thickness and is disposed on an occupant-detection-sensor-side surface of the electrode plate, so that the insulating plate is disposed between the electrode plate and the occupant detection sensor.

10. The testing apparatus according to claim 9, wherein:
    the insulating plate covers a side surface of the electrode plate as well as the occupant-detection-sensor-side surface of the electrode plate.

11. The testing apparatus according to claim 9, wherein:
    the insulating plate has a rounded peripheral edge portion on an occupant detection sensor side.

12. The testing apparatus according to claim 1, wherein:
    the seat is a seat for use in a vehicle; and
    the ground is a electrically-conductive frame of the seat.

13. The testing apparatus according to claim 1, wherein:
    the electrode plate is arranged to be movable.

14. A testing method for testing whether an occupant detection sensor normally operates, wherein the occupant detection sensor determines an occupant based on magnitude of electrostatic capacity of the occupant on a seat, the testing method comprising:
    preparing a testing apparatus that includes
        a ground that is an electrically-conductive structural member of the seat,
        an electrode plate that is electrically-conductive and is on the seat at a time of testing and, and
        a plurality of capacitors that is electrically connected between the electrode plate and the ground;
    selecting and switching one capacitor of the plurality of capacitors; and
    determining, while switching the one capacitor, whether a signal outputted from the occupant detection sensor is a determination result corresponding to the switched one capacitor.

15. The testing method according to claim 14, wherein:
    the testing apparatus further includes
        an apparatus body and
        an insulator that is disposed between the electrode plate and the apparatus body.

16. The testing method according to claim 14, further comprising:
    applying a predetermined load against the occupant detection sensor at the time of testing.

17. The testing method according to claim 15, wherein:
    when a capacitive coupling is generated between the apparatus body and the electrode plate, the electrostatic capacity of each of the plurality of capacitors is corrected with the capacitive coupling.

18. The testing method according to claim 14, wherein:
    the plurality of capacitors includes a group of capacitors whose electrostatic capacities are different from each other according to one of or both of (i) type of seat cover and (ii) a presence and an absence of a heater arranged inside the seat and electrically connected to the ground; and
    the one capacitor of the plurality of capacitors is selected and switched in accordance with test purpose.

19. The testing method according to claim 14, wherein:
    the electrode plate is arranged to be movable.

20. A testing apparatus for testing an occupant detection sensor, which performs an occupant determination operation through detecting an electrostatic capacity of an occupant on a seat, the testing apparatus comprising:
    a ground that is an electrically-conductive structural member of the seat;
    an electrode plate that is electrically-conductive and is to be put on the seat at a time of testing;

a plurality of capacitors that is different in electrostatic capacity from each other;

a switch mechanism that selectively connects the ground and the electrode plate via one of the plurality of capacitors; and a test controller that causes the occupant detection sensor to perform a first occupant detection operation while the ground and the electrode plate are being connected via a first capacitor of the plurality of capacitors, causes the occupant detection sensor to perform a second occupant detection operation while the ground and the electrode plate are being connected between the ground and the electrode plate via a second capacitor of the plurality of capacitors, and determines that the occupant detection sensor is normally operative, when (i) the electrostatic capacity detected by the occupant detection sensor in the first occupant detection operation corresponds to the electrostatic capacity of the first capacitor and (ii) the electrostatic capacity detected by the occupant detection sensor in the second occupant detection operation corresponds to the electrostatic capacity of the second capacitor.

* * * * *